United States Patent
Wu et al.

(10) Patent No.: US 9,313,019 B2
(45) Date of Patent: Apr. 12, 2016

(54) MULTI-CHANNEL TIMING RECOVERY DEVICE

(71) Applicant: REALTEK SEMICONDUCTOR CORPORATION, Hsinchu (TW)

(72) Inventors: Pei-Si Wu, Hsinchu County (TW); Feng-Cheng Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/817,588

(22) Filed: Aug. 4, 2015

(65) Prior Publication Data

US 2016/0043862 A1 Feb. 11, 2016

(30) Foreign Application Priority Data

Aug. 8, 2014 (TW) .............................. 103127390 A

(51) Int. Cl.
*H04L 7/04* (2006.01)
*H04L 7/033* (2006.01)

(52) U.S. Cl.
CPC .............. *H04L 7/0332* (2013.01); *H04L 7/042* (2013.01)

(58) Field of Classification Search
CPC ............. H03L 7/07; H03B 19/00; H04L 7/00
See application file for complete search history.

(56) References Cited

U.S. PATENT DOCUMENTS

| | | | |
|---|---|---|---|
| 5,694,062 A * | 12/1997 | Welch .................. | H03D 13/004 327/156 |
| 6,204,705 B1 | 3/2001 | Lin | |
| 7,139,347 B2 * | 11/2006 | Fujita ......................... | H03L 7/06 370/516 |
| 7,158,587 B2 | 1/2007 | Yang et al. | |
| 2004/0062333 A1 * | 4/2004 | Bertschmann ............ | H03L 7/07 375/376 |
| 2007/0146014 A1 * | 6/2007 | Cheung ................... | H03L 7/081 327/20 |
| 2008/0218226 A1 * | 9/2008 | Nagaraj .................. | H03L 7/087 327/147 |
| 2008/0232531 A1 * | 9/2008 | Feller ........................ | H03L 7/07 375/376 |
| 2010/0085086 A1 * | 4/2010 | Nedovic .................. | H03L 7/091 327/117 |
| 2011/0286562 A1 | 11/2011 | Jeon et al. | |

OTHER PUBLICATIONS

Guanghua Shu et al., A Reference-Less Clock and Data Recovery Circuit Using Phase-Rotating Phase-Locked Loop, IEEE Journal of Solid-State Circuits, vol. 49, No. 4, Apr. 2014.
Behzad Razavi, Design of integrated circuits for optical communications, Mc Graw Hill, 2003, pp. 306-309.

* cited by examiner

*Primary Examiner* — Jaison Joseph
(74) *Attorney, Agent, or Firm* — WPAT, P.C., Intellectual Property Attorneys; Anthony King

(57) ABSTRACT

The present invention discloses a multi-channel timing recovery device capable of generating a common clock for processing a plurality of data channel signals, comprising: a first channel timing recovery circuit, and a second channel timing recovery circuit. The said first channel timing recovery circuit includes a first detecting circuit capable of detecting phase and/or frequency, an oscillation control circuit, an oscillator and a feedback circuit, and is operable to generate the common clock according to a first channel signal which could be a clock signal or a data signal. The said second channel timing recovery circuit includes a second phase detecting circuit, a second phase control circuit and a second clock output circuit, and is operable to generate a second clock according to the common clock and determine the phase of the second clock according to a second channel signal which is a data signal.

20 Claims, 13 Drawing Sheets

MULTI-CHANNEL TIMING RECOVERY DEVICE

BACKGROUND OF THE INVENTION

1. Field of the Invention

The present invention relates to a timing recovery device, especially to a multi-channel timing recovery device.

2. Description of Related Art

A conventional multi-channel timing recovery configuration includes a plurality of timing recovery circuits, each of which corresponds to a data channel. In an application without any additional clock channel, each of the said timing recovery circuits generates a sampling clock exclusively for itself according to the signal from its corresponding data channel, which means that each timing recovery circuit here should be an independent and intact timing recovery circuit, and thus the whole circuit area, power consumption and cost climb up obviously. On the other hand, in an application with a clock channel, a reference clock is transmitted through the clock channel, and then a common phase locked loop is used to provide an in-phase signal and a quadrature-phase signal for each of the timing recovery circuits according to the reference clock (as it is described in the US patent with U.S. Pat. No. 7,158,587). As a result, each timing recovery circuit can generate its sampling clock according to the signal from its corresponding data channel and the said in-phase and quadrature-phase signals. Although the latter case doesn't require multiple sets of phase locked loops, it is only applicable to a system with a clock channel.

People who are interested in the prior art may refer to the following documents:
(1) Behzad Razavi "Design of integrated circuits for optical communications" Boston: McGraw-Hill, c2003. pp. 306-309.
(2) Guanghua Shu, Saurabh Saxena, Woo-Seok Choi, Mrunmay Talegaonkar, Rajesh Inti, Amr Elshazly, Brian Young and Pavan Kumar Hanumolu, "A Reference-Less Clock and Data Recovery Circuit Using Phase-Rotating Phase-Locked Loop," IEEE J. Solid-State Circuits, vol. 49, no. 4, pp. 1036-1047, April. 2014.
(3) US patent with U.S. Pat. No. 7,158,587.
(4) US patent with U.S. Pat. No. 6,204,705.
(5) US patent application with publication number 2011/0286562.

SUMMARY OF THE INVENTION

In view of the problem of the prior art, an object of the present invention is to provide a multi-channel timing recovery device capable of making improvements over the prior art.

Another object of the present invention is to provide a multi-channel timing recovery device applicable to multi-channel transmission without any clock channel and capable of reducing circuit area and power consumption.

A further object of the present invention is to provide a multi-channel timing recovery device operable to deal with either of multi-channel transmission with a clock channel and multi-channel transmission without any clock channel through a selecting circuit.

The present invention discloses a multi-channel timing recovery device capable of generating a common clock for dealing with a plurality of data channel signals. An embodiment of the multi-channel timing recovery device comprises: a first channel timing recovery circuit operable to generate the common clock; and a second channel timing recovery circuit operable to generate a second clock according to the common clock. The said first channel timing recovery circuit includes: a first detecting circuit capable of detecting phase and/or frequency and operable to detect a first channel signal according to a first clock to thereby generate a first detection signal; an oscillation control circuit operable to generate an oscillation control signal according to the first detection signal; an oscillator operable to generate the common clock according to the oscillation control signal; and a feedback circuit operable to provide the first clock according to the common clock. The said second channel timing recovery circuit includes: a second phase detecting circuit operable to detect a second channel signal according to the second clock and thereby generate a second phase detection signal; a second phase control circuit operable to generate a second phase control signal according to the second phase detection signal; and a second clock output circuit operable to generate the second clock according to the common clock and determine the phase of the second clock according to the second phase control signal. In this embodiment, the first channel signal could be a clock signal or a data signal while the second channel signal is a data signal.

Another embodiment of the above-mentioned multi-channel timing recovery device comprises: a first channel timing recovery circuit operable to generate the common clock; a second channel timing recovery circuit operable to generate a second clock according to the common clock; and a selecting circuit operable to output a first detection signal or the derived signal thereof to the first channel timing recovery circuit and thereby allow the first channel timing recovery circuit to generate the common clock accordingly. The said first channel timing recovery circuit includes: a first detecting circuit capable of detecting phase and/or frequency and operable to detect a first channel signal according to a first clock to thereby generate a first detection signal; an oscillation control circuit operable to generate an oscillation control signal according to the first detection signal; an oscillator operable to generate the common clock according to the oscillation control signal; and a feedback circuit operable to provide the first clock according to the common clock. The said second channel timing recovery circuit includes: a second phase detecting circuit operable to detect a second channel signal according to the second clock and thereby generate a second phase detection signal; a second phase control circuit operable to generate a second phase control signal according to the second phase detection signal; and a second clock output circuit operable to generate the second clock according to the common clock and determine the phase of the second clock according to the second phase control signal. The said selecting circuit is operable to receive one of the first detection signal and the derived signal thereof and one of the second phase detection signal and the derived signal thereof, and output the first detection signal or the derived signal thereof to one of the oscillation control circuit and the oscillator according to a selection control signal. In this embodiment, the first channel signal could be a clock signal or a data signal while the second channel signal is a data signal.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this invention field. If any term is defined in this specification, such term should be explained accordingly. Besides, the connection between objects in the disclosed embodiments of this specification can be direct or indirect provided that these embodiments are still applicable under such connection. Said "indirect" means that an intermediate object or a physical space is existed between the objects. In addition, the following description relates to timing recovery, and the explanation or principles thereof that have been well known in this field will be omitted if such explanation or principles have little to do with the features of the present invention. Furthermore, the shape, size, and ratio of any element in the disclosed figures of this specification are merely exemplary for understanding, not limitations in the scope of the present invention.

The multi-channel timing recovery device of the present invention is applicable to a clock and data recovery configuration for multi-channel transmission (e.g., multi-channel serial transmission). The said configuration could be a PCIE (Peripheral Component Interconnect Express) configuration, a DDR (Double Data Rate) configuration, a DisplayPort configuration, a HDMI (High Definition Multimedia Interface), a LVDS (Low Voltage Differential Signal) configuration, and etc. Regardless of the existence or absence of a reference clock from a transmission end, the present invention in either situation is capable of generating a common clock for dealing with a plurality of data channel signals, so that the circuit area and power consumption can be reduced and the compatibility can be enhanced. More specifically, the present invention provides digital and analog solutions for timing recovery applications in which some of the applications functions with a clock channel and some doesn't, and therefore different kinds of application and implementation can be satisfied.

Figure 1:
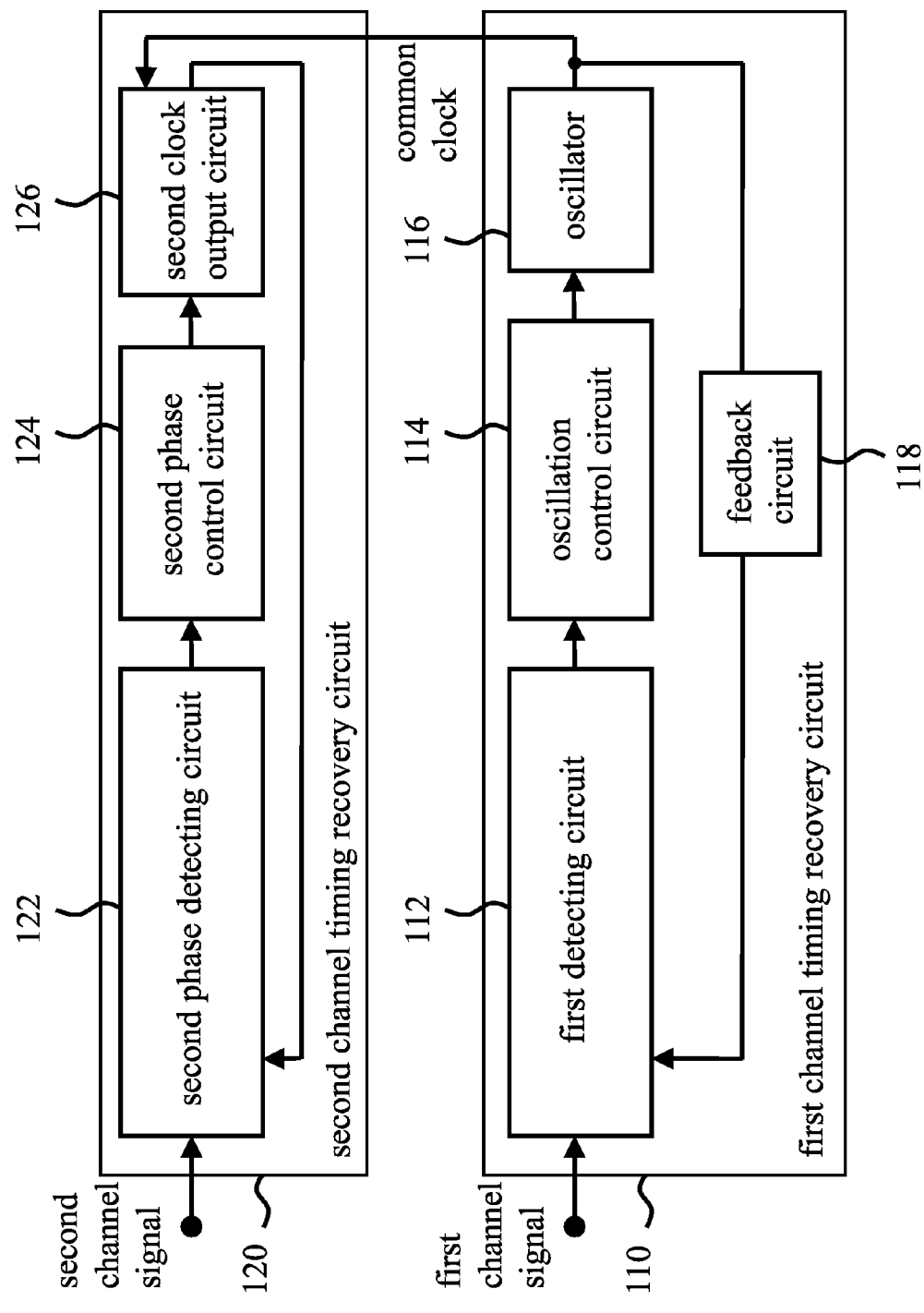
FIG. 1 illustrates an embodiment of the multi-channel timing recovery device of the present invention.

Please refer to FIG. 1 which illustrates an embodiment of the multi-channel timing recovery device of the present invention. As it is shown in FIG. 1, the multi-channel timing recovery device 100 comprises: a first channel timing recovery circuit 110 operable to receive a first channel signal and generate a common clock accordingly; and a second channel timing recovery circuit 120 operable to receive a second channel signal, generate a second clock according to the common clock, and determine the phase of the second clock according to the second channel signal. The said first channel signal could be a clock signal or a data signal while the second channel signal is a data signal. Provided that the first channel signal is a clock signal, the multi-channel timing recovery device 100 further comprises at least a data channel timing recovery circuit (e.g., the third channel timing recovery circuit 130 in FIG. 4), so that the present invention can still take care of timing recovery for multiple data channels (i.e., channels for transmitting the second and third channel signals). In this embodiment, the first channel timing recovery circuit 110 includes: a first detecting circuit 112 capable of detecting phase and/or frequency and operable to detect the above-mentioned first channel signal (e.g., a clock signal or a data signal) according to a first clock to thereby generate a first detection signal; an oscillation control circuit 114 operable to generate an oscillation control signal according to the first detection signal; an oscillator 116 operable to generate the above-mentioned common clock according to the oscillation control signal; and a feedback circuit 118 operable to provide the first clock according to the common clock for the first detecting circuit 112, wherein the oscillation control circuit 114, the oscillator 116 and the feedback circuit 118 could be realized by different means as the requirement of implementation changes, and the detail will be described in the following paragraphs. Besides, the second channel timing recovery circuit 120 includes: a second phase detecting circuit 122 operable to detect the second channel signal according to the aforementioned second clock and thereby generate a second phase detection signal; a second phase control circuit 124 operable to generate a second phase control signal according to the second phase detection signal; and a second clock output circuit 126 operable to provide the second clock according to the common clock for the second phase detecting circuit 122 and determine the phase of the second clock according to the second phase control signal, wherein the second phase control circuit 124 and the second clock output circuit 126 could be carried out by different means as the requirement of implementation changes, and the detail will also be described in the following paragraphs.

Figure 2:
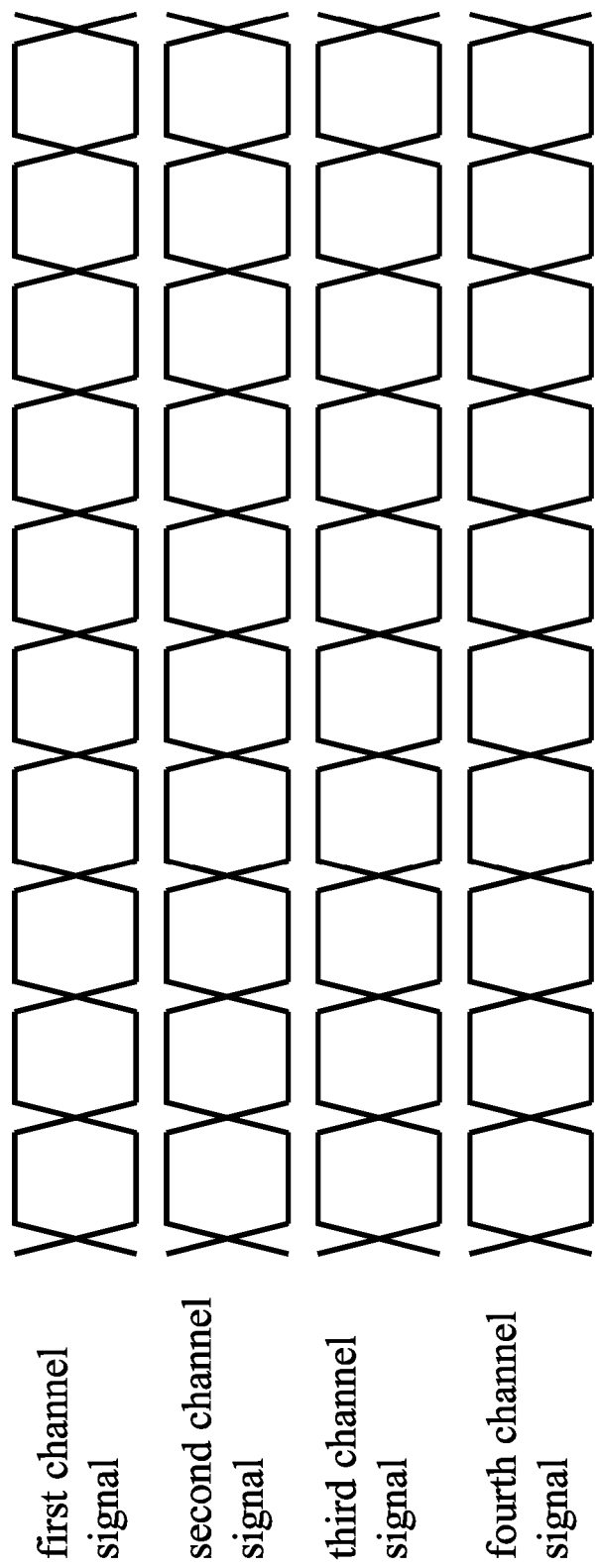
FIG. 2 illustrates a timing diagram of DisplayPort signals.
Figure 3:
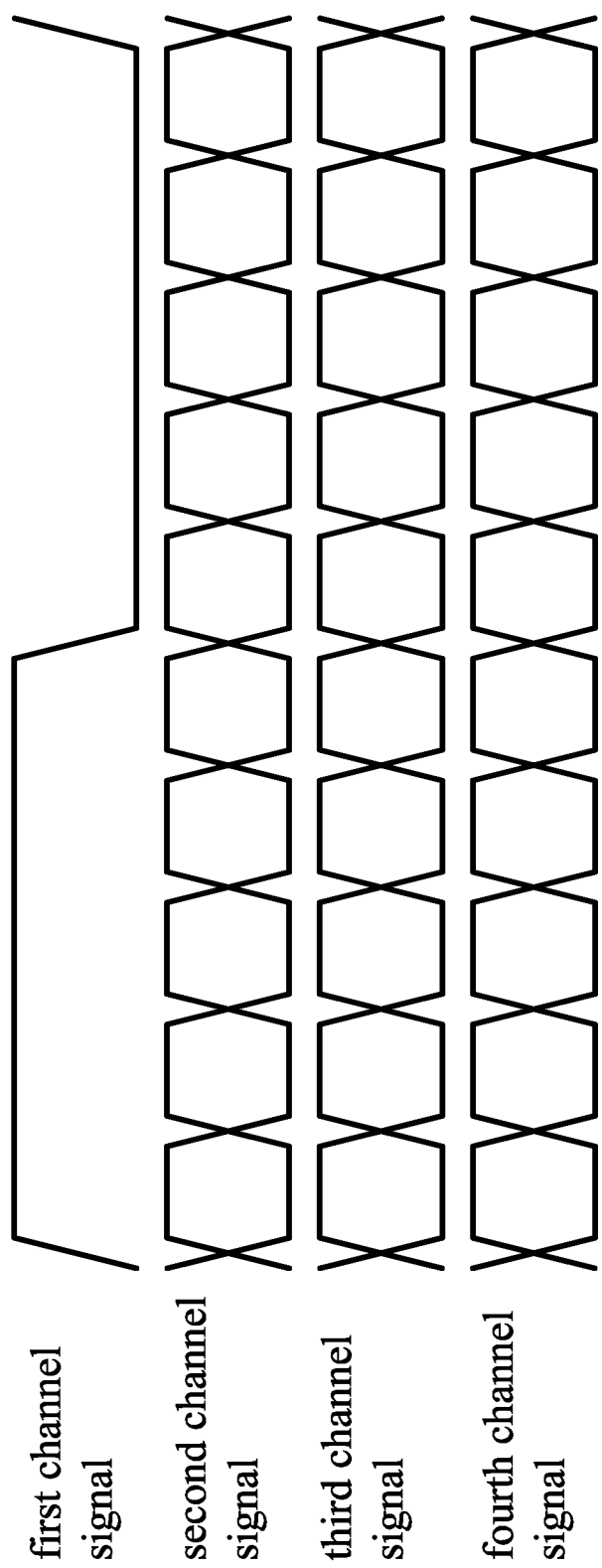
FIG. 3 illustrates a timing diagram of High Definition Multimedia Interface signals.

As it is described in the preceding paragraphs, the multi-channel timing recovery device 100 of FIG. 1 can be carried out through either of digital and analog means, and is operable to deal with timing recovery for multiple data channels. For instance, both the aforementioned first and second channel signals are data signals as shown in the DisplayPort signals timing diagram of FIG. 2 while the DisplayPort signals further include a third and a fourth channel signals which are also data signals. In another scenario, the first and second channel signals are clock and data signals respectively as shown in the HDMI signals timing diagram of FIG. 3 while the HDMI signals further include a third and a fourth channel signals. In this scenario, the second, third and fourth channel signals are red, green and blue data signals respectively; however, this is just exemplary for understanding.

Figure 4:
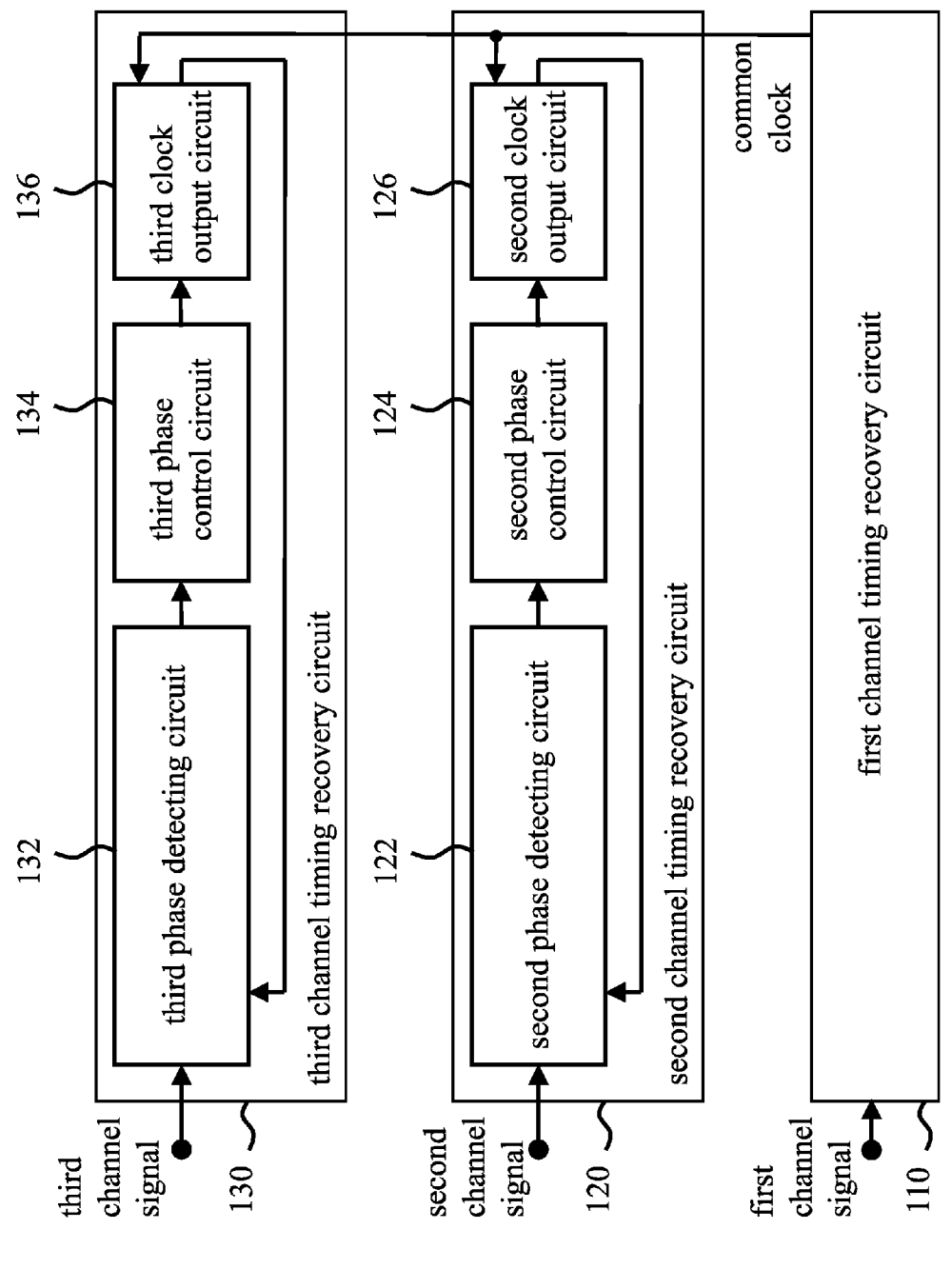
FIG. 4 illustrates the multi-channel timing recovery device of FIG. 1 generating a common clock according to a clock signal.

On the basis of the above, providing the first channel signal is a clock signal, since the present invention aims at having the capability of doing timing recovery for multiple data channels, the multi-channel timing recovery device 100 as shown in FIG. 4 further comprises: a third channel timing recovery circuit 130 operable to receive a third channel signal and generate a third clock according to the aforementioned common clock, and determine the phase of the third clock according to the third channel signal. In detail, the third channel signal is a data signal, and the third channel timing recovery circuit 130 includes: a third phase detecting circuit 132 operable to detect the third channel signal according to the third clock and thereby generate a third phase detection signal; a third phase control circuit 134 operable to generate a third phase control signal according to the third phase detection signal; and a third clock output circuit 136 operable to generate the third clock according to the common clock and determine the phase of the third clock in accordance with the third phase control signal.

Figure 5:
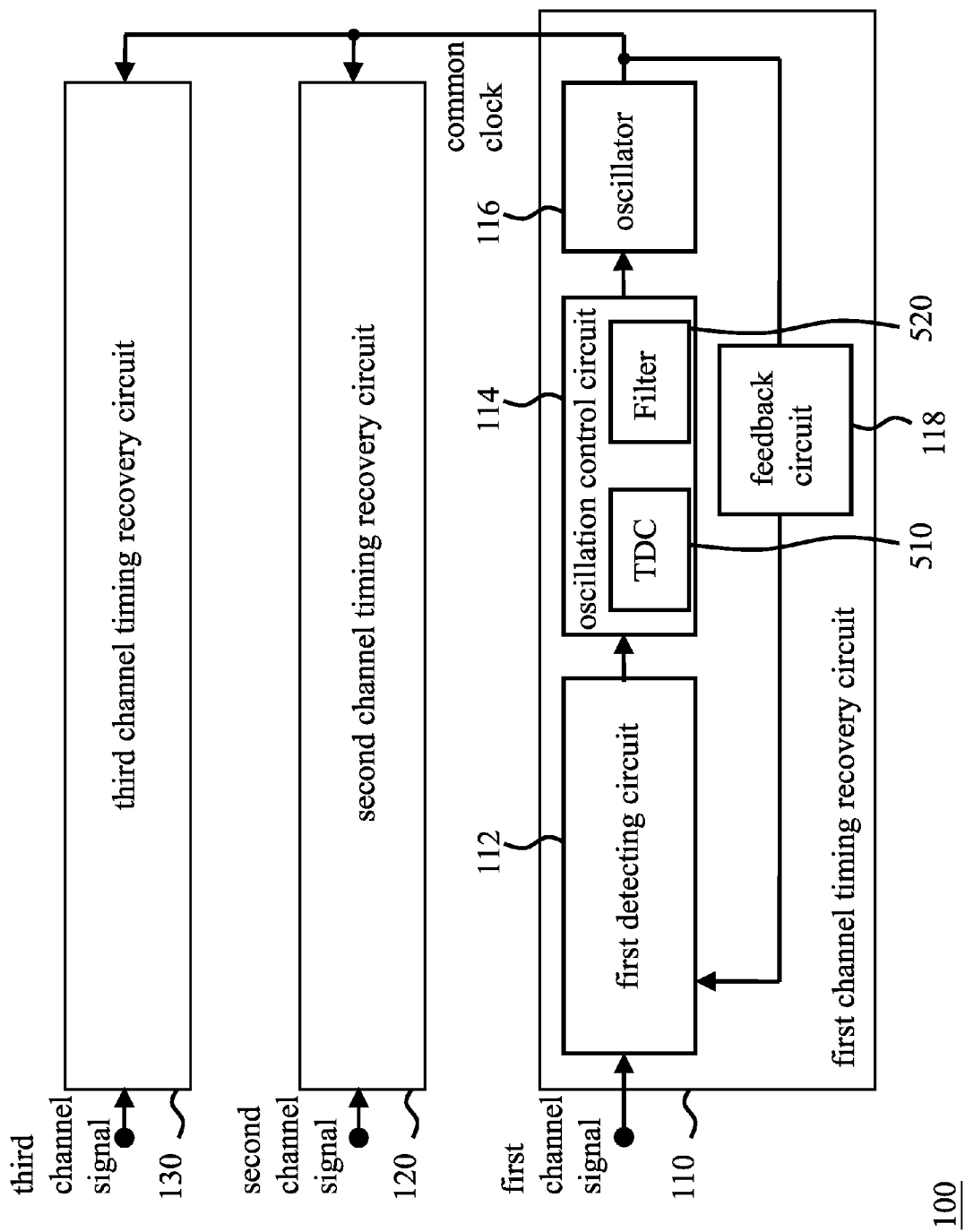
FIG. 5 illustrates an embodiment of the multi-channel timing recovery device of FIG. 4 being carried out by means of digital techniques.
Figure 6:
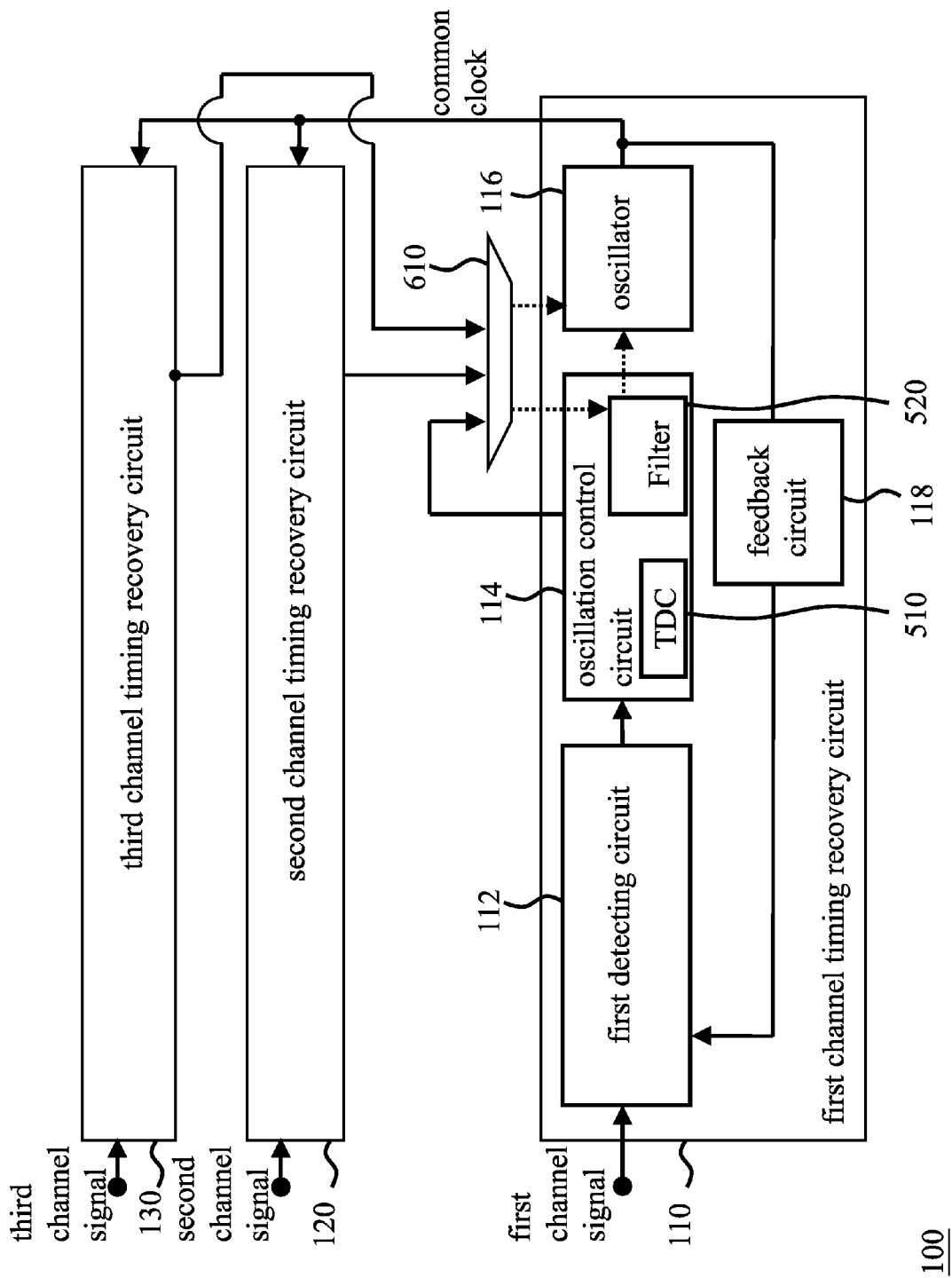
FIG. 6 illustrates the embodiment of FIG. 5 further including a selecting circuit.

Please refer to FIG. 5, in the case of carrying out the multi-channel timing recovery device 100 of FIG. 4 by means of digital techniques, an embodiment of the oscillation control circuit 114 includes: a timing-to-digital converter (TDC) 510 operable to generate a frequency adjustment signal according to the aforementioned first detection signal; and a first filter (Filter) 520 operable to generate the aforementioned oscillation control signal according to the frequency adjustment signal in which the TDC 510 alone is well-known in this industry and the first filter 520 such as a digital low pass filter or the like alone is also well-known. Besides, on the basis of the embodiment of FIG. 5, if one is going to make this embodiment be capable of generating the common clock according to the said second/third phase detection signal or the second/third phase control signal, that is to say making this embodiment be applicable to multi-channel transmission without any clock channel, the multi-channel timing recovery device 100 as shown in FIG. 6 may further comprise: a selecting circuit 610 (e.g., a multiplexer) operable to receive at least one of the frequency adjustment signal and the oscillation control signal and receive at least one of the second and third phase detection signals or at least one of the second and third phase control signals, and then output the frequency adjustment signal to the first filter 520 or the oscillation control signal to the oscillator 116 in accordance with a selection control signal, so as to generate the common clock, wherein the selection control signal could be generated through a control circuit (not shown in the figure) or associated with a constant or variable storage value. In addition, on the basis of the embodiments of FIGS. 4 and 5, an embodiment of the oscillator 116 includes a digital control oscillator (DCO) operable to generate the common clock according to the oscillation control signal in which the common clock here is a single clock instead of a plurality of multi-phase clocks (e.g., an in-phase clock and a quadrature-phase clock); an embodiment of the feedback circuit 118 includes a frequency divider (e.g., a frequency divider executing division by ten) operable to generate the first clock according to the common clock; an embodiment of the second/third phase control circuit 124/134 includes a second/third filter (e.g., a digital low pass filter) operable to generate the second/third phase control signal according to the second/third phase detection signal; and an embodiment of the second/third clock output circuit 126/136 includes a second/third phase rotator or any known/self-developed appropriate phase selector operable to generate the second/third clock according to the common clock and determine the phase of the second/third clock according to the second/third phase control signal. In principle, the circuit configurations of the data channel timing recovery circuits (e.g., the second and third channel timing recovery circuits 120, 130) for receiving data signals in the same embodiment are identical or equivalent.

Figure 7:
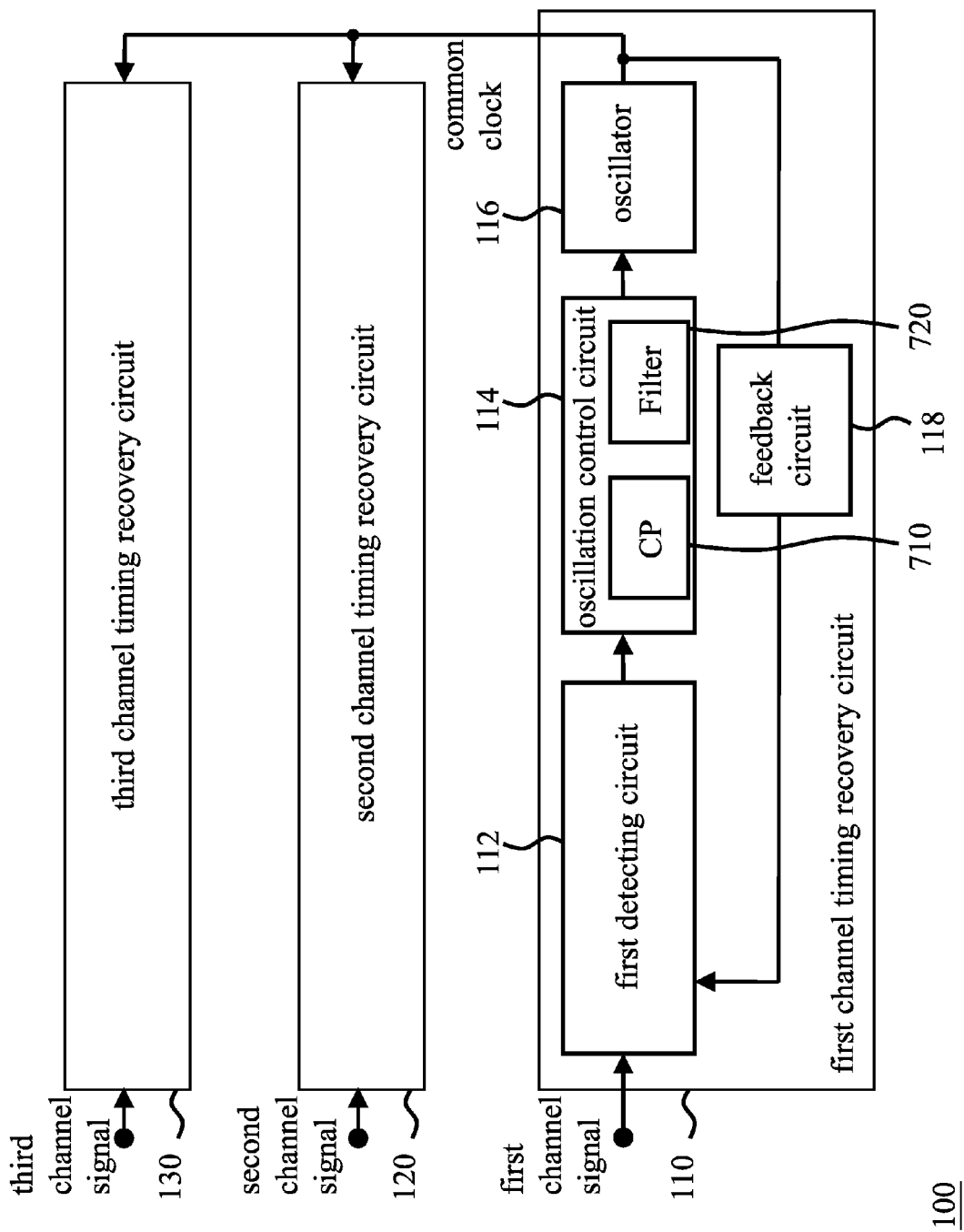
FIG. 7 illustrates an embodiment of the multi-channel timing recovery device of FIG. 4 being carried out by means of analog techniques.
Figure 8:
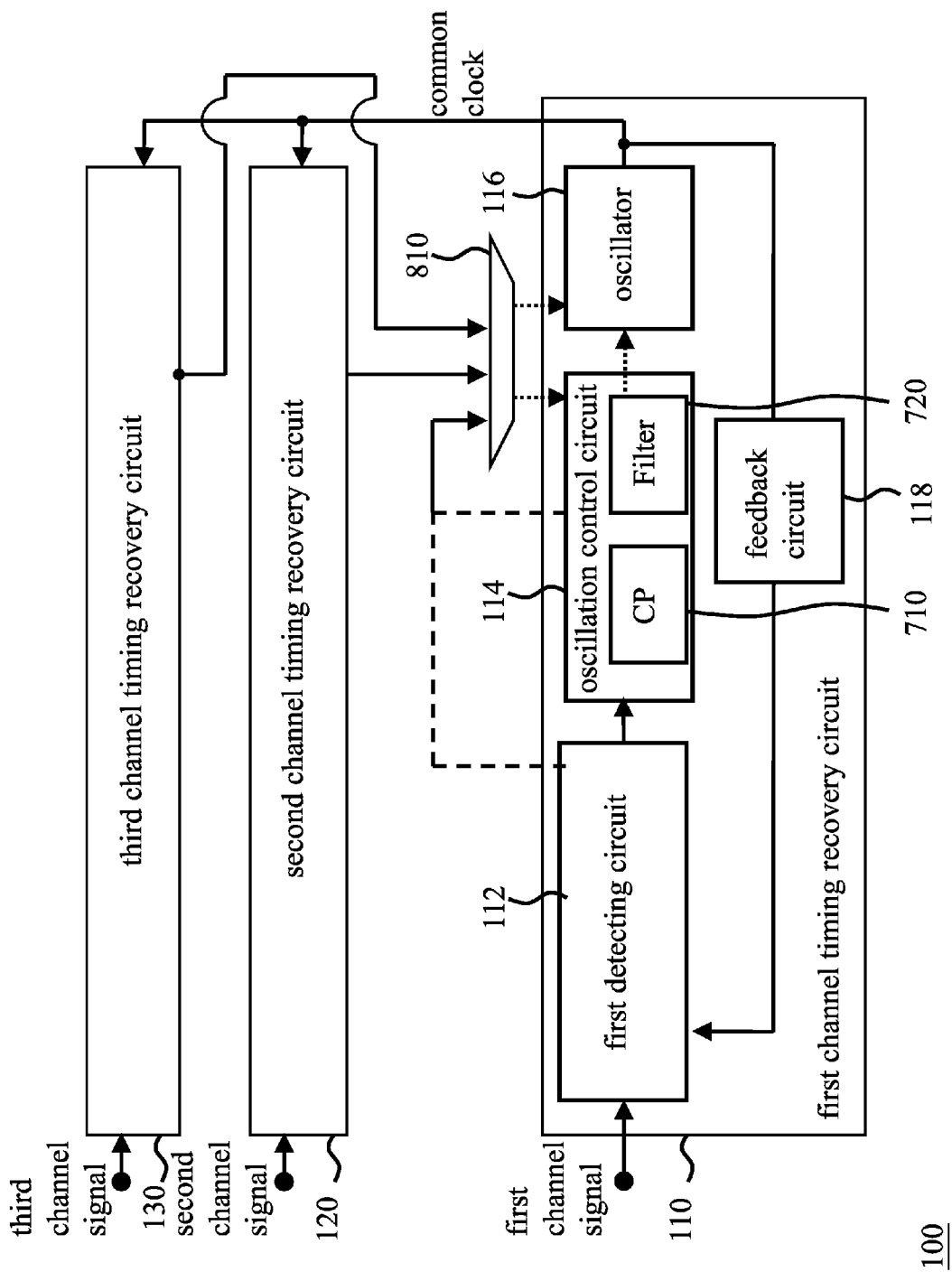
FIG. 8 illustrates the embodiment of FIG. 7 further including a selecting circuit.

In addition to the digital solution of FIG. 5, the multi-channel timing recovery device 100 of FIG. 4 can also be carried out by means of analog techniques. In this scenario, as it is shown in FIG. 7, an embodiment of the oscillation control circuit 114 includes: a first charge pump (CP) 710 operable to generate a first frequency adjustment signal according to the first detection signal; and a first filter (Filter) 720 operable to generate the oscillation control signal according to the first frequency adjustment signal in which the first charge pump 710 alone is well known in this industry and the first filter 720 such as a low pass filter alone is also well known. On the basis of the embodiments of FIG. 4 and FIG. 7, if one is going to make this embodiment be capable of generating the common clock according to the second/third phase detection signal or the second/third phase control signal, that is to say making this embodiment be applicable to multi-channel transmission without any clock channel, the multi-channel timing recovery device 100 as shown in FIG. 8 may further comprise: a selecting circuit 810 (e.g., a multiplexer) operable to receive at least one of the first detection signal, the first frequency adjustment signal and the oscillation control signal and receive at least one of the second and third phase detection signals and the signal(s) derived therefrom, and then output the first detection signal to the first charge pump 710, output the first frequency adjustment signal to the first filter 720, or output the oscillation control signal to the oscillator 116 in accordance with a selection control signal, so as to generate the common clock, wherein the selection control signal could be generated through a control circuit (not shown in the figure) or associated with a constant or variable storage value. In addition, on the basis of the embodiment of FIG. 7, an embodiment of the oscillator 116 includes a voltage control oscillator (VCO) operable to generate the common clock according to the oscillation control signal in which the common clock here is a single clock instead of a plurality of multi-phase clocks (e.g., an in-phase clock and a quadrature-phase clock); an embodiment of the feedback circuit 118 includes a frequency divider (e.g., a frequency divider executing division by ten) operable to generate the first clock according to the common clock; an embodiment of the second/third phase control circuit 124/134 includes a second/third charge pump and a second/third filter (e.g., a low pass filter) operable to generate a second/third frequency adjustment signal according to the second/third phase detection signal and generate the second/third phase control signal according to the second/third frequency adjustment signal; and an embodiment of the second/third clock output circuit 126/136 includes a second/third voltage control delay line (VCDL) or a known/self-developed appropriate phase decision circuit operable to generate the second/third clock according to the common clock and determine the phase of the second/third clock according to the second/third phase control signal. Please note that the circuit configurations of the data channel timing recovery circuits (e.g., the second and third channel timing recovery circuits 120, 130) for receiving data signals in the same embodiment are identical or equivalent.

Figure 9:
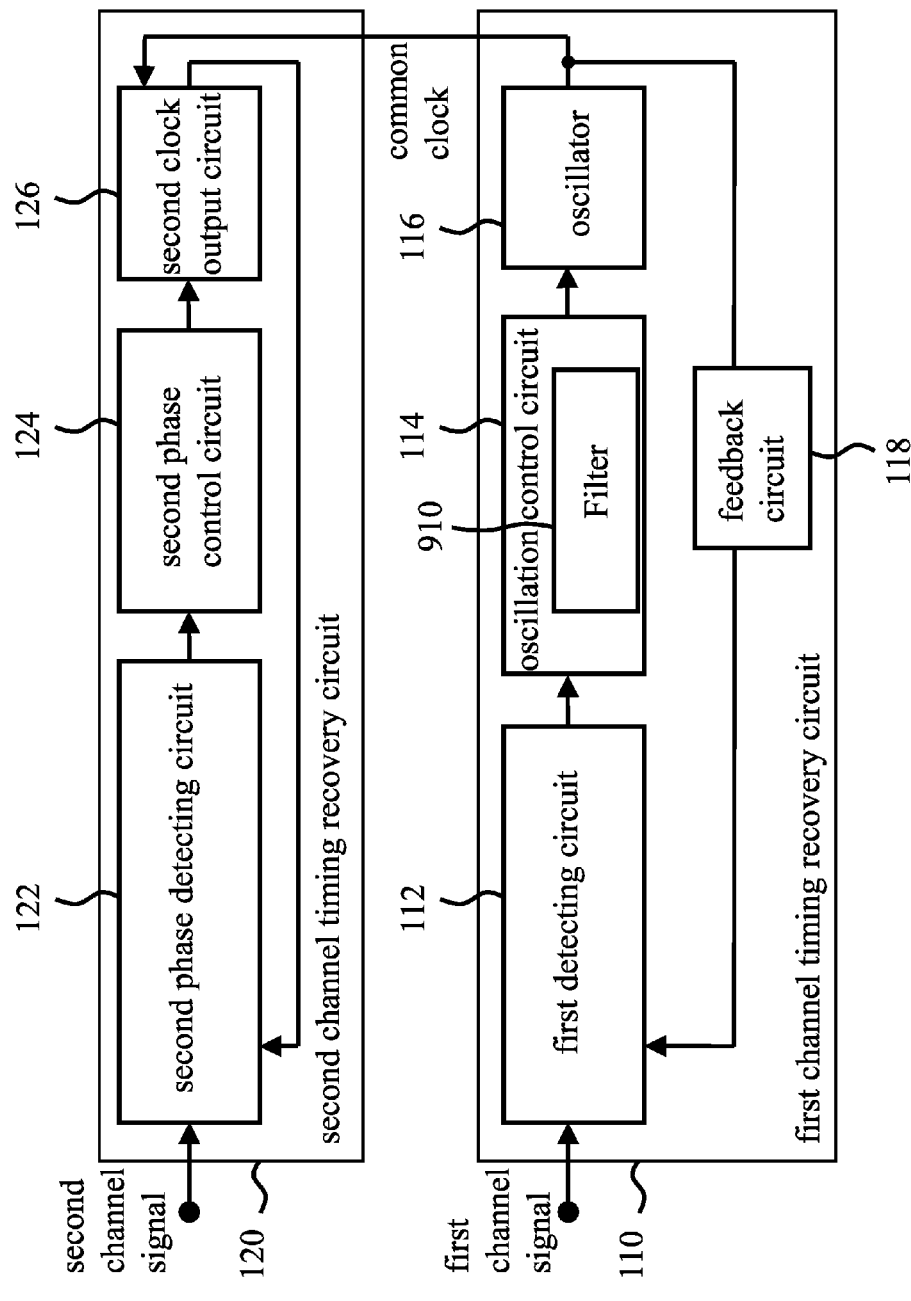
FIG. 9 illustrates the multi-channel timing recovery device of FIG. 1 generating a common clock according to a data signal by means of digital techniques.
Figure 10:
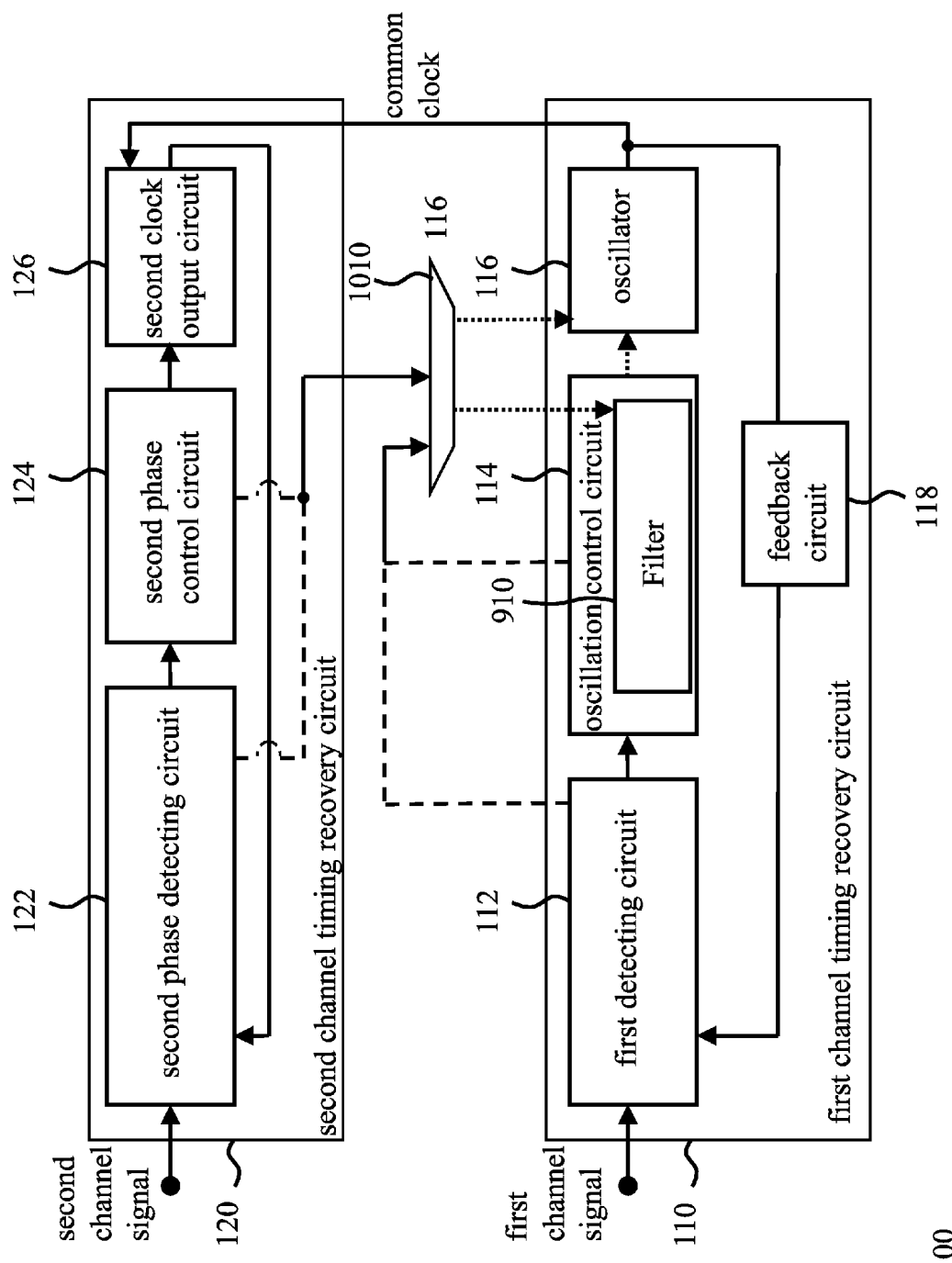
FIG. 10 illustrates the embodiment of FIG. 9 further including a selecting circuit.

On the other hand, providing the aforementioned first channel signal is a data signal, in the case of carrying out the multi-channel timing recovery device 100 of FIG. 1 by means of digital techniques, an embodiment of the oscillation control circuit 114 as shown in FIG. 9 includes: a first filter 910 (e.g., a digital low pass filter) operable to generate the oscillation control signal. Furthermore, on the basis of FIG. 9, if one is going to make this embodiment be operable to generate the common clock according to the second phase detection signal or the second phase control signal, the multi-channel timing recovery device 100 as shown in FIG. 10 may further comprise: a selecting circuit 1010 (e.g., a multiplexer) operable to receive the first detection signal and the second phase detection signal or receive the oscillation control signal and the second phase control signal, and then output the first detection signal to the first filter 910 or output the oscillation control signal to the oscillator 116 in accordance with a selection control signal, so as to generate the common clock, wherein the selection control signal could be generated through a control circuit (not shown in the figure) or associated with a constant or variable storage value. Moreover, on the same basis of FIG. 9, an embodiment of the oscillator 116 includes a digital control oscillator operable to generate the common clock according to the oscillation control signal in which the common clock here is a single clock or a plurality of multi-phase clocks; an embodiment of the feedback circuit 118 includes a frequency divider (when the sampling frequency of the first detecting circuit 112 is lower than the frequency of the first channel signal) or is a feedback path without frequency adjustment (when the sampling frequency of the first detecting circuit 112 is equal to the frequency of the first channel signal), and is operable to provide the first clock according to the common clock; an embodiment of the second phase control circuit 124 includes a second filter (e.g., a digital low pass filter) operable to generate the second phase control signal according to the second phase detection signal; and an embodiment of the second clock output circuit 126 includes a second phase rotator or the like operable to generate the second clock according to the common clock and determine the phase of the second clock in accordance with the second phase control signal.

Figure 11:
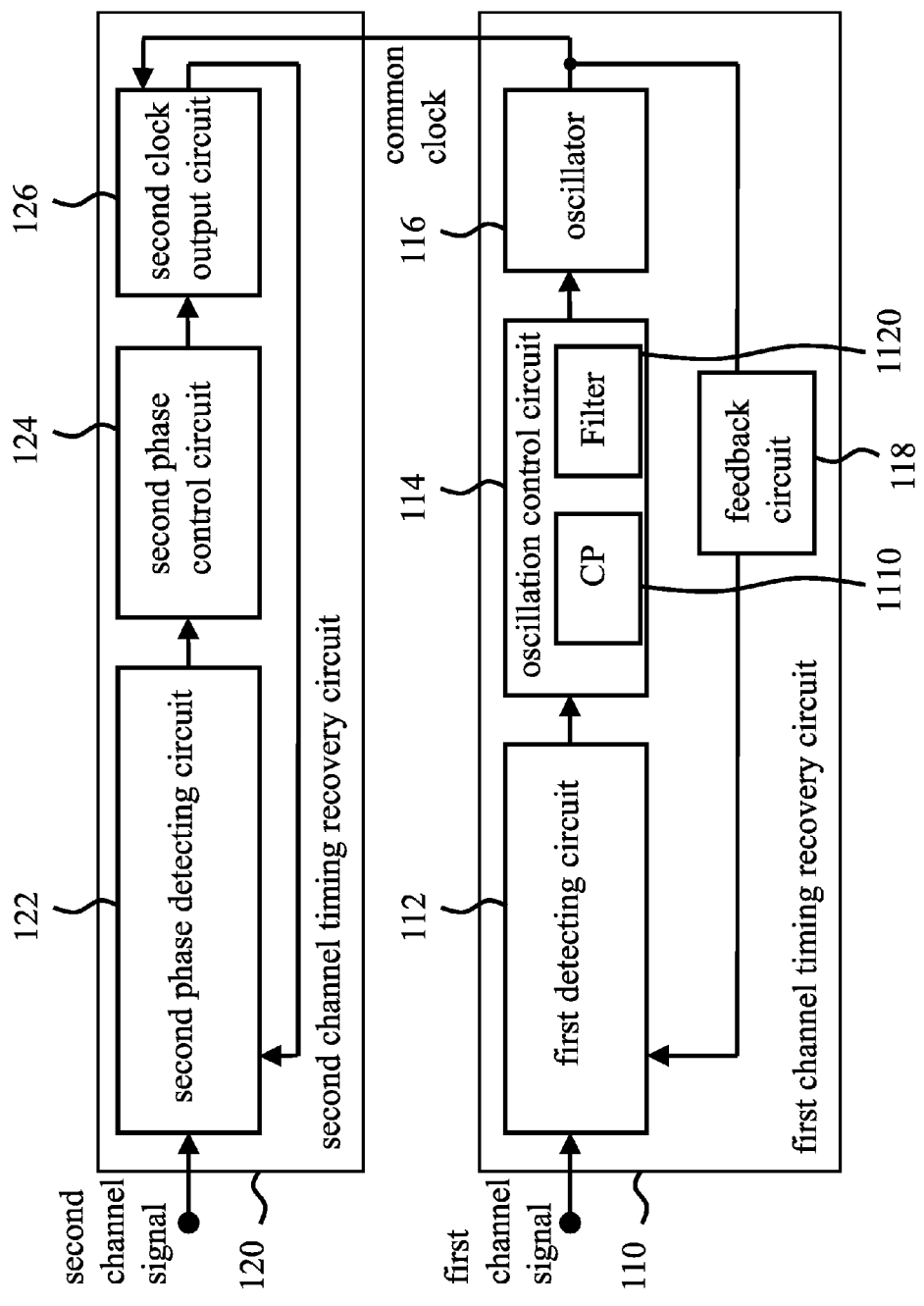
FIG. 11 illustrates the multi-channel timing recovery device of FIG. 1 generating a common clock according to a data signal by means of analog techniques.
Figure 12:
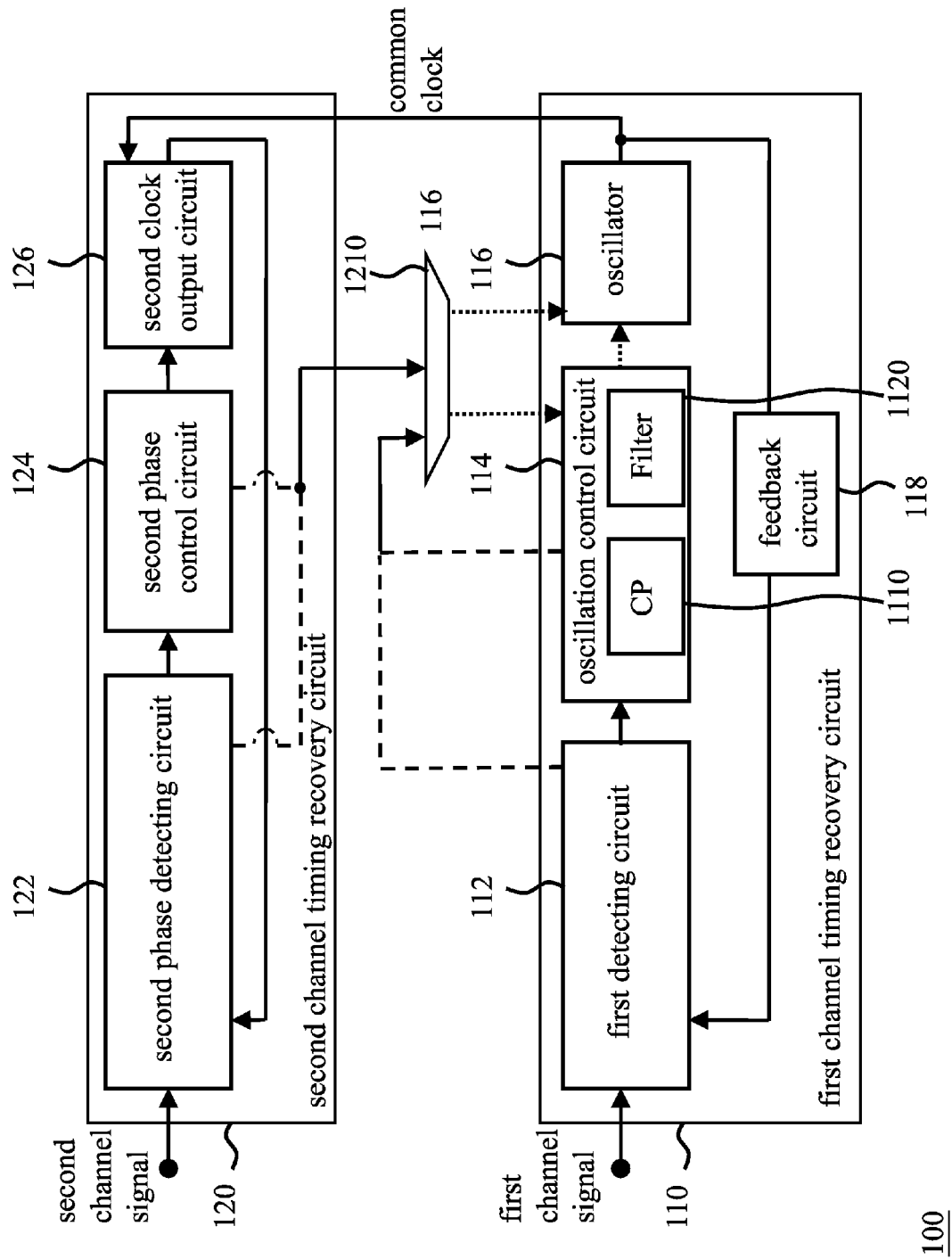
FIG. 12 illustrates the embodiment of FIG. 11 further including a selecting circuit.

Providing the first channel signal is still a data signal, in addition to the above-described digital solution, the multi-channel timing recovery device 100 of FIG. 1 can also be carried out by means of analog techniques. In this scenario, as it is shown in FIG. 11, an embodiment of the oscillation control circuit 114 comprises: a first charge pump (CP) 1110 operable to generate a first frequency adjustment signal; and a first filter (Filter) 1120 (e.g., a low pass filter) operable to generate the oscillation control signal according to the first frequency adjustment signal. On the basis of FIG. 11, if one is going to make the oscillator 116 be capable of generating the common clock according to the aforementioned second phase detection signal or the second phase control signal, the multi-channel timing recovery device 100 as shown in FIG. 12 may further comprise: a selecting circuit 1210 (e.g., a multiplexer) operable to receive one of the first detection signal, the first frequency adjustment signal and the oscillation control signal and receive at least one of the second phase detection signal and the signal derived therefrom, and then output the first detection signal to the first charge pump 1110, output the first frequency adjustment signal to the first filter 1120, or output the oscillation control signal to the oscillator 116 in accordance with a selection control signal, so as to generate the common clock, wherein the selection control signal could be generated through a control circuit (not shown in the figure) or associated with a constant or variable storage value. On the same basis of FIG. 11, an embodiment of oscillator 116 includes a voltage control oscillator operable to generate the common clock according to the oscillation control signal in which the common clock is a single clock or a plurality of multi-phase clocks; an embodiment of the feedback circuit 118 includes a frequency divider or is a feedback path without frequency adjustment, and is operable to provide the first clock according to the common clock; an embodiment of the second phase control circuit 124 includes a second charge pump and a second filter (e.g., a low pass filter) which are operable to generate a second frequency adjustment signal according to the second phase detection signal and generate the second phase control signal according to the second frequency adjustment signal respectively; and an embodiment of the second clock output circuit 126 includes a second voltage control delay line or the like operable to generate the second clock according to the common clock and determine the phase of the second clock according to the second phase control signal.

Figure 13:
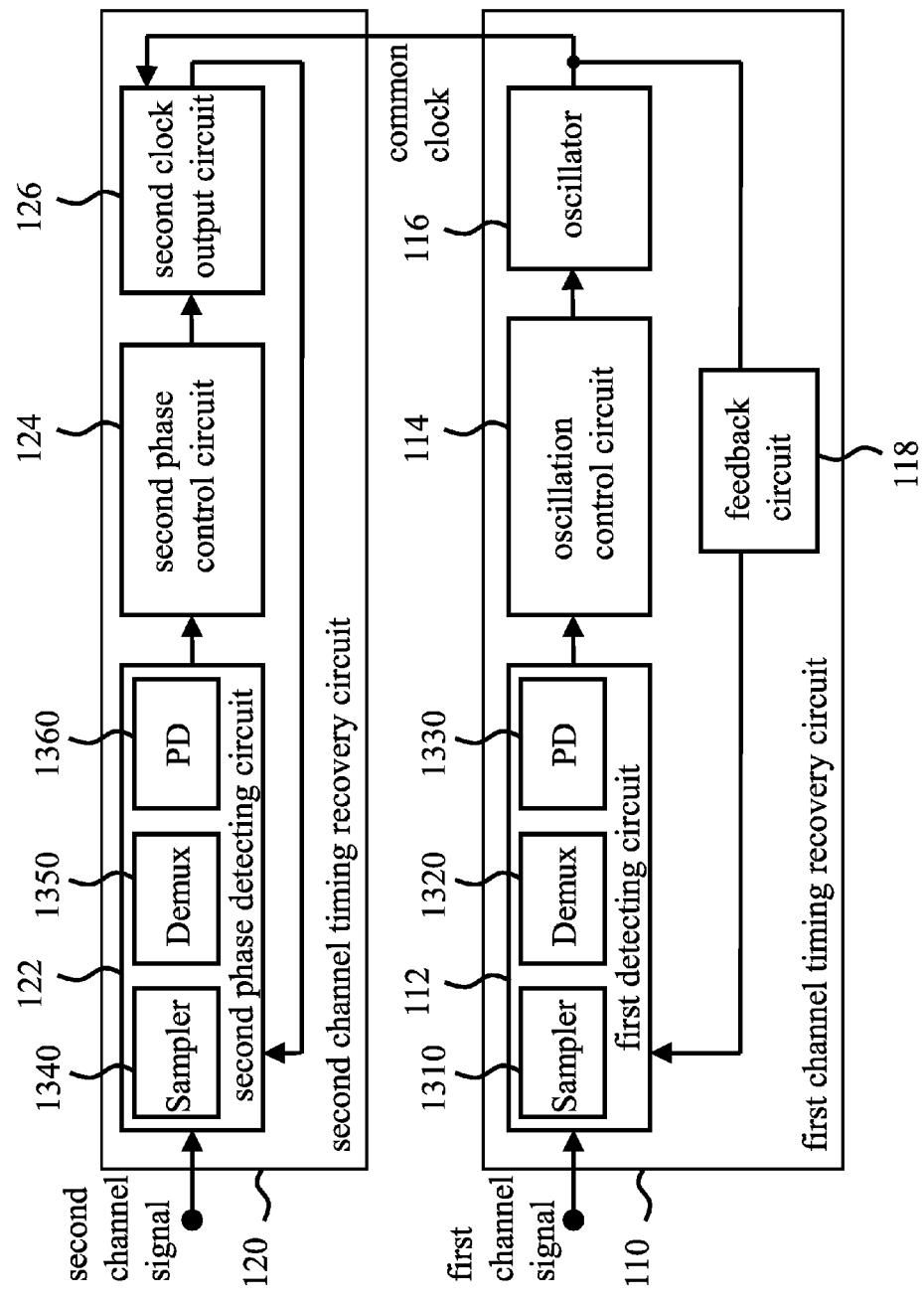
FIG. 13 is an embodiment of the first detecting circuit and the second phase detecting circuit of FIG. 1.

Please note that the aforementioned detecting circuit (e.g., the first detecting circuit 122 and the second and third phase detecting circuits 122, 132) could be realized by means of known or self-developed techniques. For instance, on the basis of FIG. 9, the first detecting circuit 112 as shown in FIG. 13 includes: a first sampler (Sampler) 1310 operable to generate a first sampling signal; a first de-multiplexer (Demux) 1320 operable to generate a first output signal according to the first sampling signal; and a first phase detecting unit (PD) 1330 operable to generate the first detection signal according to the first output signal. Similarly, the second phase detecting circuit 122 include: a second sampler (Sampler) 1340 operable to generate a second sampling signal; a second de-multiplexer (Demux) 1350 operable to generate a second output signal according to the second sampling signal; and a second phase detecting unit (PD) 1360 operable to generate the second phase detection signal according to the second output signal. In principle, the configurations of phase detecting circuits in the same embodiment are identical or equivalent.

It should be noted that in each of the aforementioned embodiments, any two data signals (e.g., the second and third channel signals of FIG. 4, or the first and second channel signals of FIG. 9) have the same frequency and different or identical phases; and the frequency of the clock signal (e.g., the first channel signal of FIG. 4) is different from or the same as the frequency of any data signal. For instance, the ratio of the frequency of the clock signal to the frequency of any data signal is an integer.

Each of the above-disclosed embodiments includes one or more features. If an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention. Besides, the terms "first", "second" and etc. in this specification are used for distinction rather than limitations in the order, function or claim scope.

In summary, the multi-channel timing recovery device of the present invention is operable to generate a common clock to reduce circuit area and power consumption, and applicable to both the multi-channel transmission without a clock channel and the multi-channel transmission with a clock channel. Furthermore, the multi-channel timing recovery device can be realized by means of digital and analog techniques, so that different kinds of implementation and application can be taken into consideration.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:
1. A multi-channel timing recovery device capable of generating a common clock for dealing with a plurality of data channel signals, comprising:

a first channel timing recovery circuit operable to generate the common clock, including:
a first detecting circuit capable of detecting phase and/or frequency and operable to detect a first channel signal according to a first clock to thereby generate a first detection signal;
an oscillation control circuit operable to generate an oscillation control signal according to the first detection signal, including one of the follows: a combination of a timing-to-digital converter and a first digital filter, a combination of a first charge pump and a first analog filter, and a digital filter;
an oscillator operable to generate the common clock according to the oscillation control signal; and
a feedback circuit operable to provide the first clock according to the common clock; and
a second channel timing recovery circuit operable to generate a second clock according to the common clock, including:
a second phase detecting circuit operable to detect a second channel signal according to the second clock and thereby generate a second phase detection signal;
a second phase control circuit operable to generate a second phase control signal according to the second phase detection signal; and
a second clock output circuit operable to generate the second clock according to the common clock and determine the phase of the second clock according to the second phase control signal; and
a selecting circuit operable to receive one of the first detection signal and the derived signal thereof and receive one of the second phase detection signal and the derived signal thereof, and output the first detection signal or the derived signal thereof to one of the oscillation control circuit and the oscillator according to a selection control signal.

2. The multi-channel timing recovery device of claim 1, further comprising:
a third channel timing recovery circuit operable to generate a third clock according to the common clock, including:
a third phase detecting circuit operable to detect a third channel signal according to the third clock and thereby generate a third phase detection signal;
a third phase control circuit operable to generate a third phase control signal according to the third phase detection signal; and
a third clock output circuit operable to generate the third clock according to the common clock and determine the phase of the third clock according to the third phase control signal,
wherein the first channel signal is a clock signal or a first data signal, and the second and third channel signals are second and third data signals respectively.

3. The multi-channel timing recovery device of claim 2, wherein the first channel signal is the clock signal.

4. The multi-channel timing recovery device of claim 3, wherein the oscillation control circuit includes:
the timing-to-digital converter operable to generate a frequency adjustment signal according to the first detection signal; and
the first digital filter operable to generate the oscillation control signal according to the frequency adjustment signal.

5. The multi-channel timing recovery device of claim 4, applied to an HDMI (High Definition Multimedia Interface) configuration.

6. The multi-channel timing recovery device of claim 4, wherein the oscillator includes a digital control oscillator (DCO) operable to generate the common clock according to the oscillation control signal, the feedback circuit includes a frequency divider operable to generate the first clock according to the common clock, the second phase control circuit includes a second filter operable to generate the second phase control signal according to the second phase detection signal, and the second clock output circuit includes a second phase rotator operable to generate the second clock according to the common clock and determine the phase of the second clock according to the second phase control signal.

7. The multi-channel timing recovery device of claim 3, wherein the oscillation control circuit includes:
the first charge pump operable to generate a first frequency adjustment signal according to the first detection signal; and
the first analog filter operable to generate the oscillation control signal according to the first frequency adjustment signal.

8. The multi-channel timing recovery device of claim 7, applied to an HDMI (High Definition Multimedia Interface) configuration.

9. The multi-channel timing recovery device of claim 7, wherein the oscillator includes a voltage control oscillator (VCO) operable to generate the common clock according to the oscillation control signal, the feedback circuit includes a frequency divider operable to generate the first clock according to the common clock, the second phase control circuit includes a second charge pump and a second filter operable to generate a second frequency adjustment signal according to the second phase detection signal and generate the second phase control signal according to the second frequency adjustment signal respectively, and the second clock output circuit includes a second voltage control delay line (VCDL) operable to generate the second clock according to the common clock and determine the phase of the second clock according to the second phase control signal.

10. The multi-channel timing recovery device of claim 2, wherein the first channel signal is the first data signal.

11. The multi-channel timing recovery device of claim 10, wherein the oscillation control circuit includes:
the digital filter operable to generate the oscillation control signal according to the first detection signal.

12. The multi-channel timing recovery device of claim 11, applied to a DisplayPort configuration.

13. The multi-channel timing recovery device of claim 11, wherein the oscillator includes a digital control oscillator operable to generate the common clock according to the oscillation control signal, the feedback circuit includes one of a frequency divider and a feedback path without frequency adjustment and is operable to provide the first clock according to the common clock, the second phase control circuit includes a second filter operable to generate the second phase control signal according to the second phase detection signal, and the second clock output circuit includes a second phase rotator operable to generate the second clock according to the common clock and determine the phase of the second clock according to the second phase control signal.

14. The multi-channel timing recovery device of claim 10, wherein the oscillation control circuit includes:
the first charge pump operable to generate a first frequency adjustment signal according to the first detection signal; and
the first analog filter operable to generate the oscillation control signal according to the first frequency adjustment signal.

15. The multi-channel timing recovery device of claim 14, applied to a DisplayPort configuration.

16. The multi-channel timing recovery device of claim 14, wherein the oscillator includes a voltage control oscillator operable to generate the common clock according to the oscillation control signal, the feedback circuit includes one of a frequency divider and a feedback path without frequency adjustment and is operable to generate the first clock according to the common clock, the second phase control circuit includes a second charge pump and a second filter operable to generate a second frequency adjustment signal according to the second phase detection signal and generate the second phase control signal according to the second frequency adjustment signal respectively, and the second clock output circuit includes a second voltage control delay line operable to generate the second clock according to the common clock and determine the phase of the second clock according to the second phase control signal.

17. The multi-channel timing recovery device of claim 1, wherein the first detecting circuit includes:
- a first sampler operable to generate a first sampling signal according to the first channel signal;
- a first de-multiplexing unit operable to generate a first output signal according to the first sampling signal and the first clock; and
- a first phase detecting unit operable to generate the first detection signal according to the first output signal and the first clock, and the second phase detecting circuit includes:
- a second sampler operable to generate a second sampling signal according to the second channel signal;
- a second de-multiplexing unit operable to generate a second output signal according to the second sampling signal and the second clock; and
- a second phase detecting unit operable to generate the second phase detection signal according to the second output signal and the second clock.

18. A multi-channel timing recovery device capable of generating a common clock for dealing with a plurality of data channel signals, comprising:
- a first channel timing recovery circuit operable to generate the common clock, including:
  - a first detecting circuit capable of detecting phase and/or frequency and operable to detect a first channel signal according to a first clock to thereby generate a first detection signal;
  - an oscillation control circuit operable to generate an oscillation control signal according to the first detection signal;
  - an oscillator operable to generate the common clock according to the oscillation control signal; and
  - a feedback circuit operable to generate the first clock according to the common clock;
- a second channel timing recovery circuit operable to generate a second clock according to the common clock, including:
  - a second phase detecting circuit operable to detect a second channel signal according to the second clock and thereby generate a second phase detection signal;
  - a second phase control circuit operable to generate a second phase control signal according to the second phase detection signal; and
  - a second clock output circuit operable to generate the second clock according to the common clock and determine the phase of the second clock according to the second phase control signal; and
- a selecting circuit operable to receive one of the first detection signal and the derived signal thereof and one of the second phase detection signal and the derived signal thereof, and output the first detection signal or the derived signal thereof to one of the oscillation control circuit and the oscillator according to a selection control signal.

19. The multi-channel timing recovery device of claim 18, further comprising:
- a third channel timing recovery circuit operable to generate a third clock according to the common clock, including:
  - a third phase detecting circuit operable to detect a third channel signal according to the third clock and thereby generate a third phase detection signal;
  - a third phase control circuit operable to generate a third phase control signal according to the third phase detection signal; and
  - a third clock output circuit operable to generate the third clock according to the common clock and determine the phase of the third clock according to the third phase control signal, wherein the first channel signal is a clock signal or a first data signal, and the second and third channel signals are second and third data signals respectively.

20. The multi-channel timing recovery device of claim 19, wherein the frequency of the clock signal is different from any of the frequencies of the second and third data signals.

\* \* \* \* \*